US00RE45804E

(19) United States
(12) Reissued Patent
Mancini

(10) Patent Number: US RE45,804 E
(45) Date of Reissued Patent: Nov. 17, 2015

(54) WINDOW WITH BUILT-IN DEVICES THAT SENSES CARBON MONOXIDE AND OPENS ITSELF POWERED BY LIGHT

(71) Applicant: Alfredo Mancini, Manhasset, NY (US)

(72) Inventor: Alfredo Mancini, Manhasset, NY (US)

(21) Appl. No.: 13/998,919

(22) Filed: Dec. 23, 2013

Related U.S. Patent Documents

Reissue of:
(64) Patent No.: 8,120,501
Issued: Feb. 21, 2012
Appl. No.: 11/998,681
Filed: Nov. 30, 2007

(51) Int. Cl.
*G08B 17/10* (2006.01)
*E06B 7/02* (2006.01)

(52) U.S. Cl.
CPC ..... *E06B 7/02* (2013.01)

(58) Field of Classification Search
CPC ..... G01D 21/00; G08B 17/11; B60K 28/06; E06B 7/02
USPC ..... 340/632, 539.26, 628, 629, 630, 631; 320/101
See application file for complete search history.

(56) References Cited

U.S. PATENT DOCUMENTS

| | | | | |
|---|---|---|---|---|
| 4,338,526 | A * | 7/1982 | Martin et al. | 307/116 |
| 5,413,161 | A * | 5/1995 | Corazzini | 160/7 |
| 6,072,398 | A * | 6/2000 | Hayes et al. | 340/632 |
| 6,208,256 | B1 * | 3/2001 | Fleming et al. | 340/632 |
| 6,989,757 | B2 * | 1/2006 | Geoffrey et al. | 340/632 |
| 7,183,933 | B2 * | 2/2007 | Dzurko et al. | 340/632 |
| 7,574,826 | B2 * | 8/2009 | Evans | 49/8 |
| 7,710,284 | B2 * | 5/2010 | Dzurko et al. | 340/632 |
| 8,106,768 | B2 * | 1/2012 | Neumann | 340/539.26 |

* cited by examiner

*Primary Examiner* — Linh M Nguyen

(57) ABSTRACT

A window with built-in devices that senses carbon monoxide; powered only by the exterior daylight; that automatically opens by itself and sounds an alarm when a dangerous level of carbon monoxide is sensed to release the accumulated carbon monoxide and let the clean air with fresh oxygen enter the contaminated area to prevent or minimize poisoning and/or death of humans & animals without the need of any human physical action; the provided contacts can be connected to a private alarm station to alert the Fire & Police Departments to provide immediate assistance to the endangered humans & animals and protect the opened residence.

1 Claim, 6 Drawing Sheets

Amended

Illustrative Diagram of the Electrical Devices

Amended
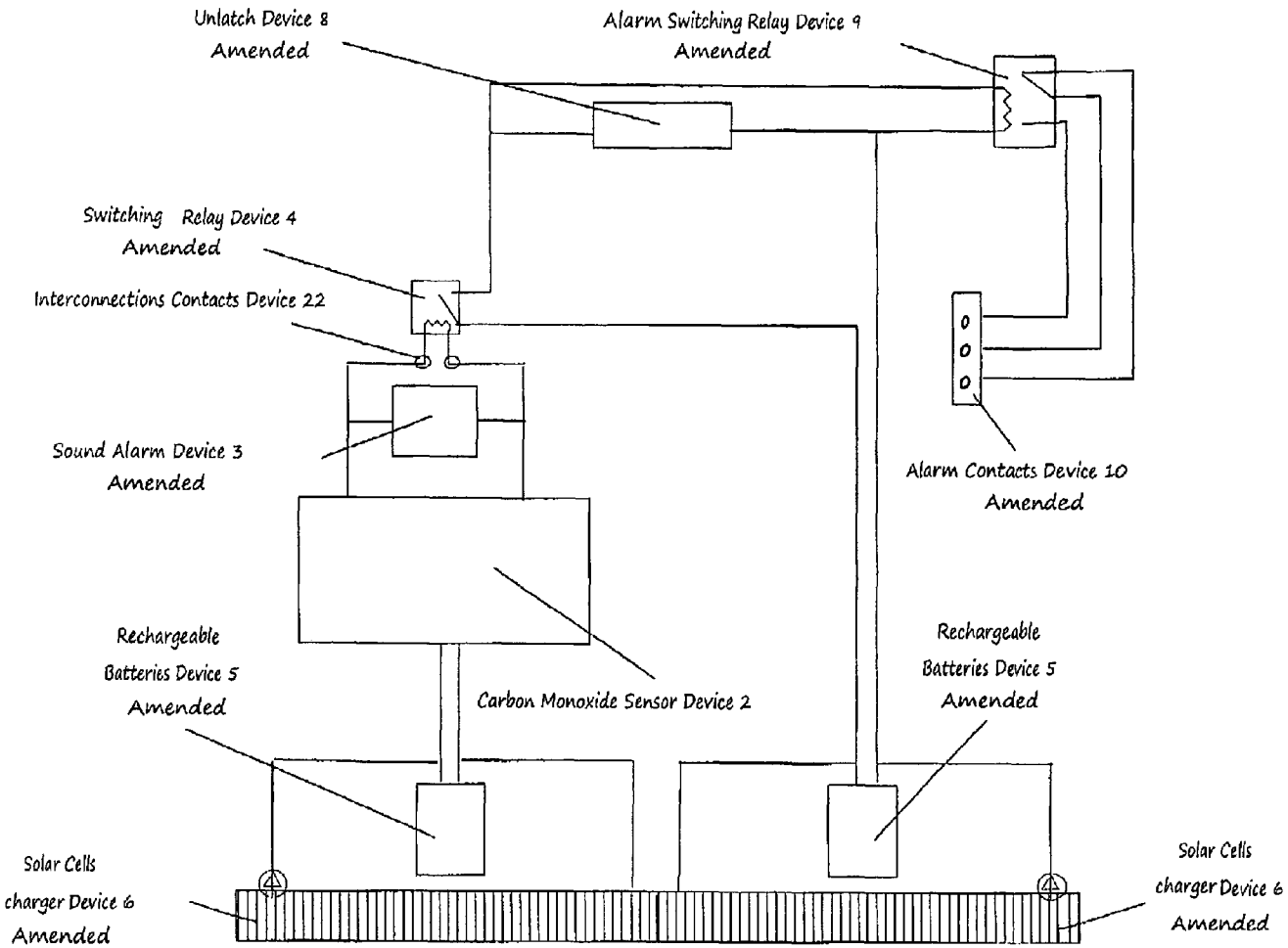
FIG 1 Illustrative Diagram of the Electrical Devices

Amended
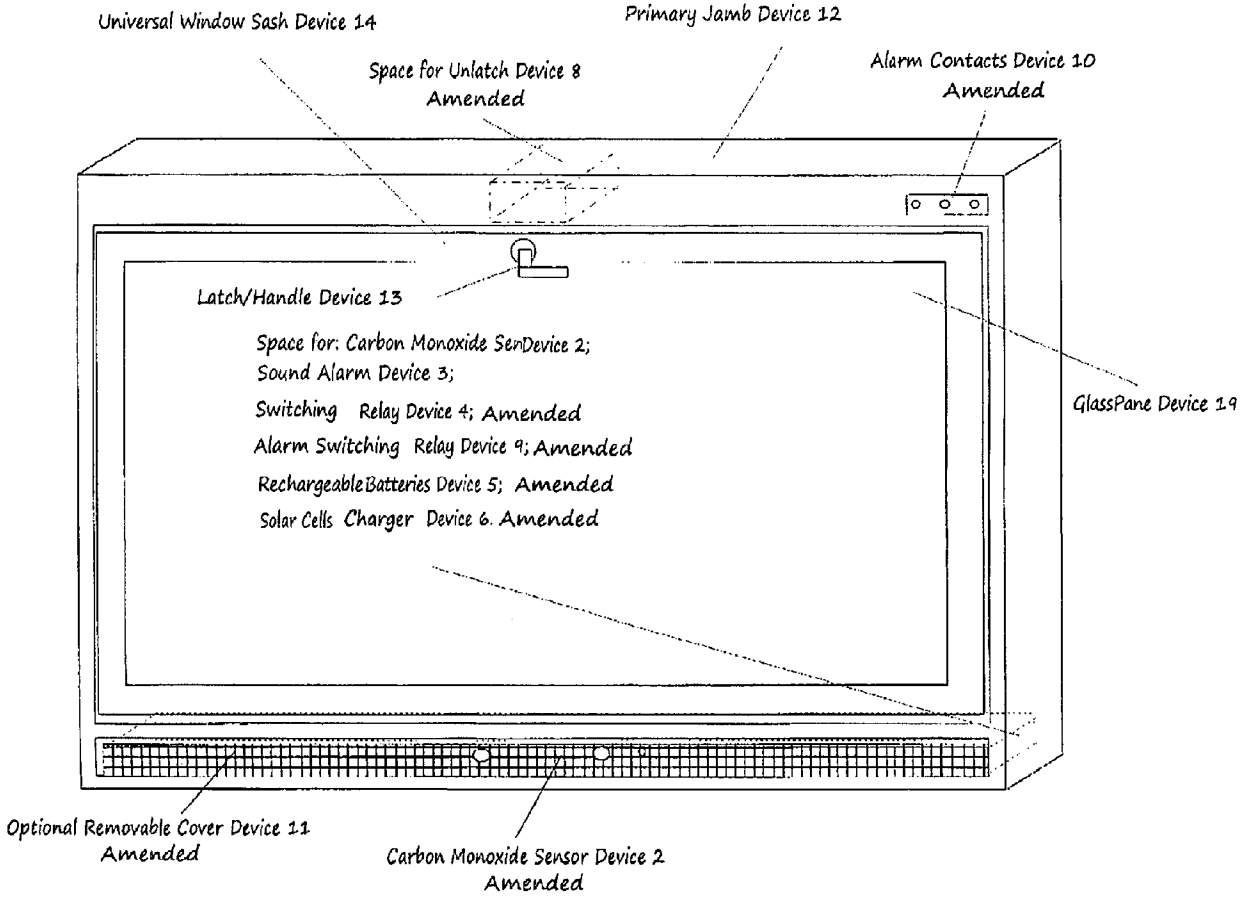
FIG. 2 Interior Front View of the Window

Amended
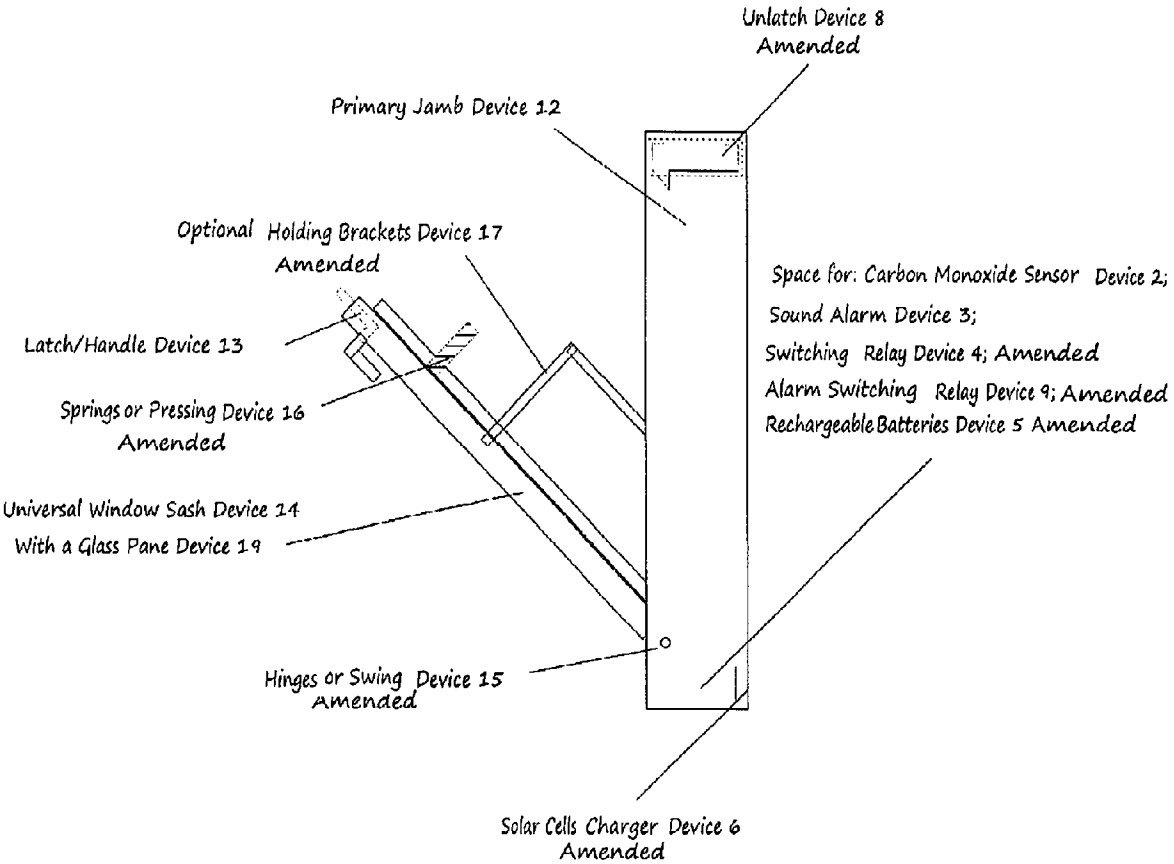
FIG.3 Side View of the Window

Amended
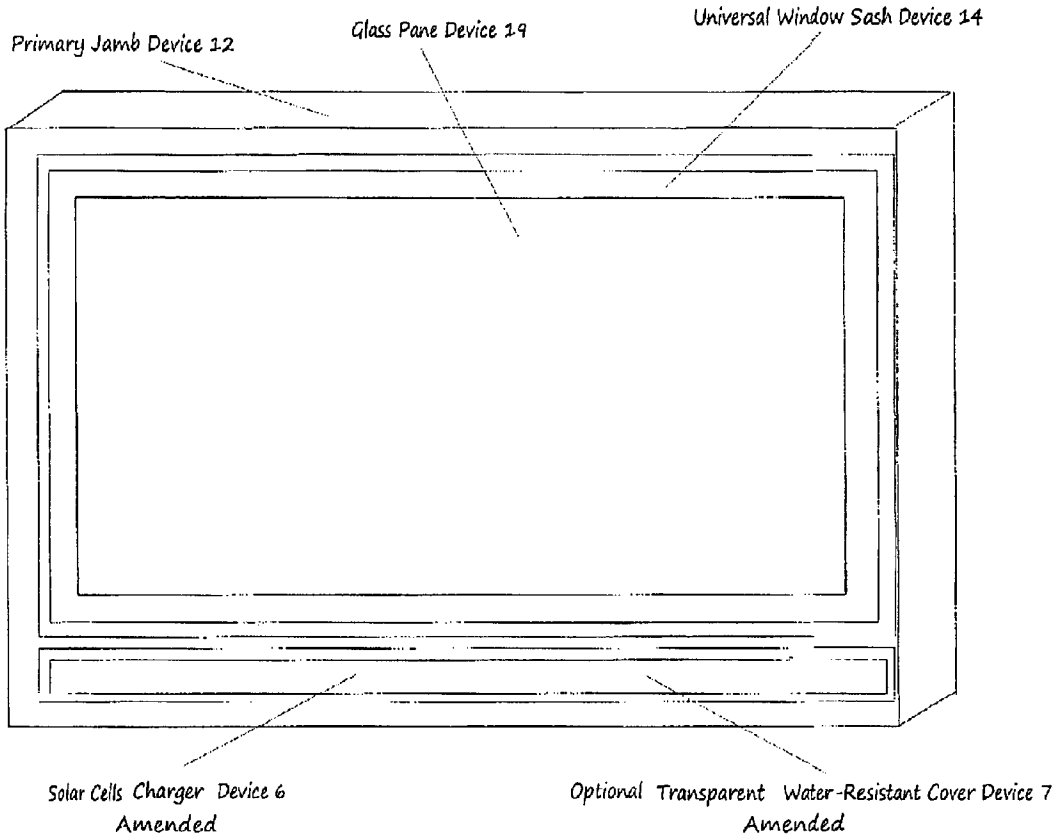
FIG. 4 Exterior Front View of Window

Amended
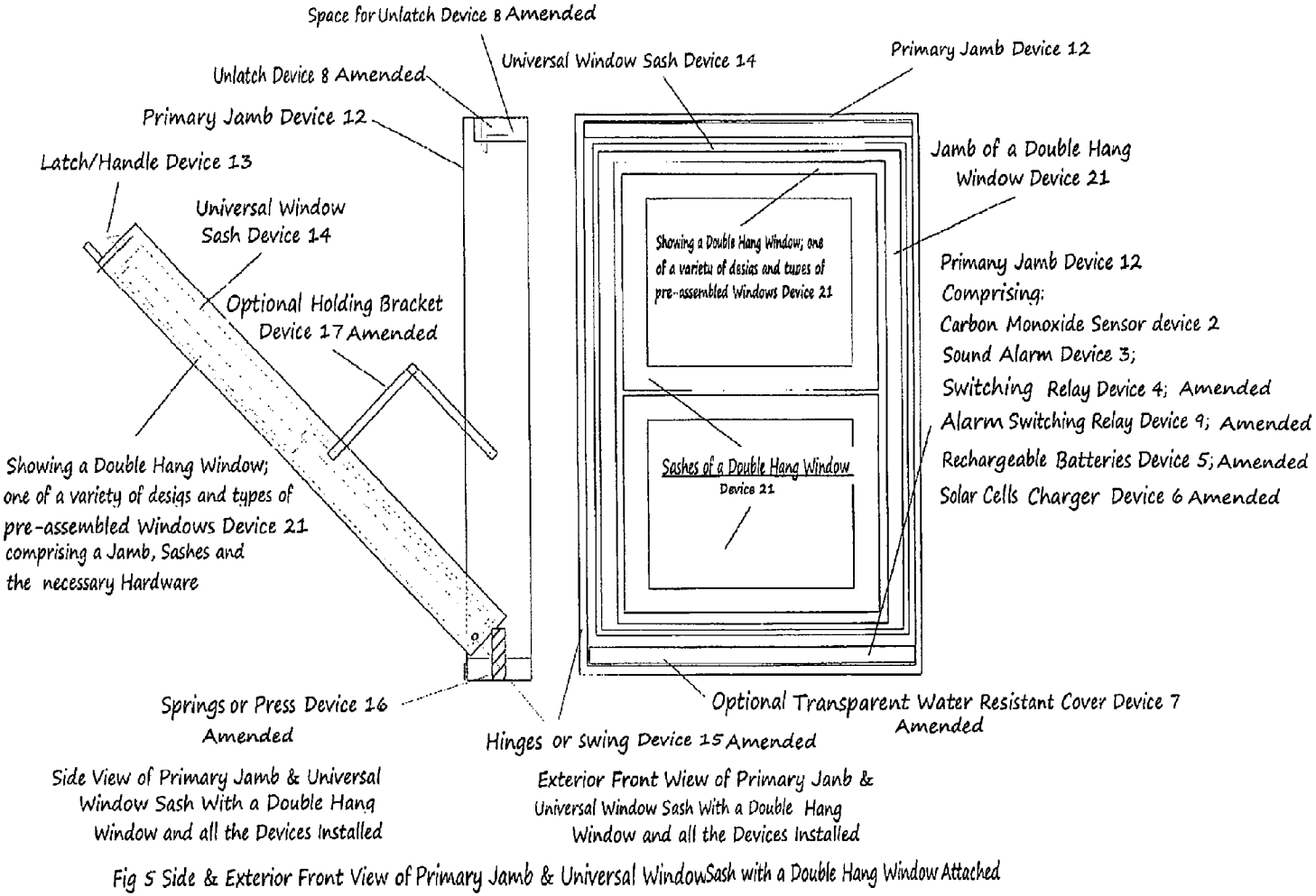
Fig 5 Side & Exterior Front View of Primary Jamb & Universal WindowSash with a Double Hang Window Attached Amended
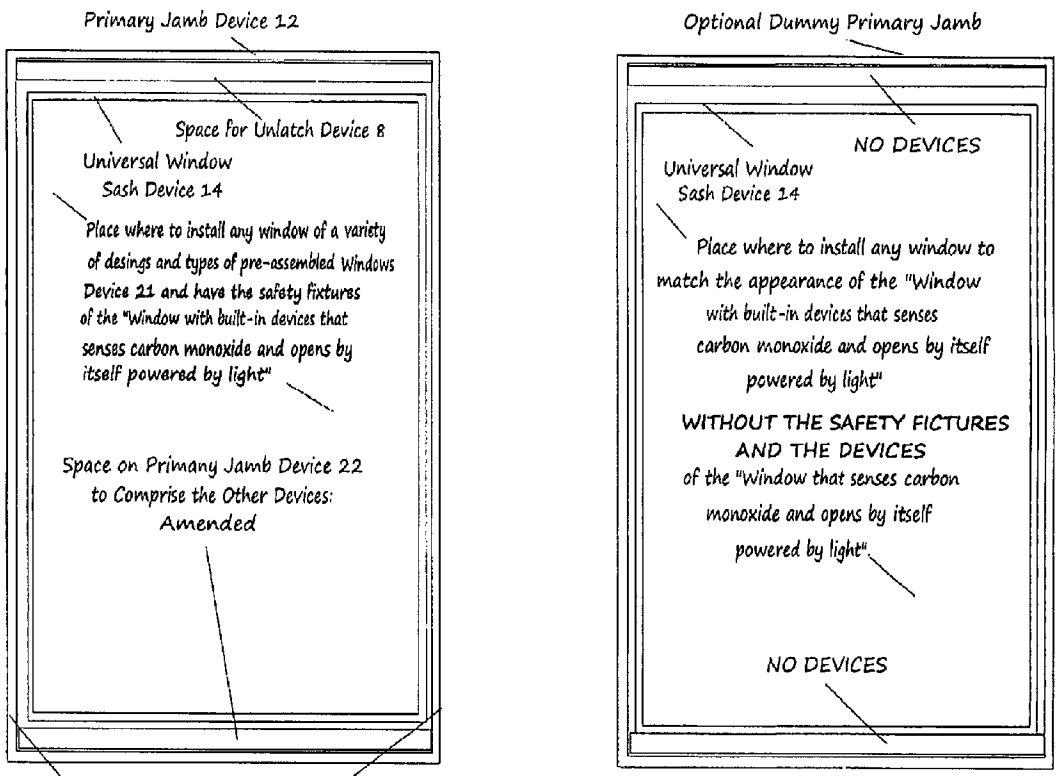
Primary Jamb & Universal Sash
With Devices to Install Any Window
Optional Dummy Jamb & Universal
Sash Without Devices to Install Any Window
Fig 6 Exterior Front View of Primary Jamb & Universal Sashand an Optional Dummy Jamb with an Attached Universal Jamb

WINDOW WITH BUILT-IN DEVICES THAT SENSES CARBON MONOXIDE AND OPENS ITSELF POWERED BY LIGHT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of Invention

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

This invention relates to a new window comprising [built-in] devices that can sense carbon monoxide in the inside environment of a room, especially in bedrooms where humans or animals sleep; and when a dangerous level of carbon monoxide; is sensed automatically opens by itself to reduce the concentration of carbon monoxide; allowing a flow of outside air to enter the room to ventilate and mix new oxygen with the contaminated environment inside the room; to save the occupants lives without depending on any human physical action, any external power supply, or a short term life replaceable [alkaline] batteries.

The main purpose of this new invention is to avoid and/or minimize the most dangerous effects of carbon monoxide poisoning to human beings; from brain damage, to the death.

According to a report from Judith Katz, Director Air Protection Division U.S. EPA Region III (Release date: Feb. 9, 1999): "Every year, poisonous gas backup from clogged chimney or defective furnaces as well kerosene heaters, propane heaters, electrical generators or domestic gas cooking burners and ovens, to name few, send 15,000 people to the hospital and kill 700 Americans."

When an emergency takes place and people start getting poisoned by carbon monoxide, disregarding the source of the carbon monoxide; there is a need for an immediate action: provide ventilation to the affected area, to minimize the carbon monoxide concentration and supply clean air with oxygen; otherwise the occupants will die poisoned by the accumulated carbon monoxide; this is a confirmed fact: Air Protection Division U.S. EPA Region III.

[The] *This* invention [that I claim] will take the immediate physical action to resolve the problem when the emergency of carbon monoxide concentration takes place; by automatically opening the universal sash of this new window and giving a "first aid of fresh air" to the occupants in the contaminated room, without depending on any unreliable power supply to activate the window devices, while at the same time the warning alarm will sound; and if the [accessible] *alarm* contacts are connected to a private central station alarm company, the [built-in] *comprised* devices will trigger the alert to the Fire & Police Department to provide immediate assistance to humans and/or animals and to protect the opened window of the residence, if at the time of the occurrence the residence is unoccupied; the normal/routine use of manually open and close of the window, will not trigger the alert to the Fire & Police Department; and the [accessible] *alarm* contacts connected to a private central station alarm company will not interfere with any other burglary alarm system connected/installed to this window.

To be more specific, the devices of this new window that sense carbon monoxide and automatically open by itself, are powered only by the exterior light; this light is transformed into electrical energy by [two sets of independent] *the* solar cell *charger* devices 6[a and 6b] exposed to the daylight 365 days a year; and disregarding cloudy days, the amount of charging energy produced by the solar cells *charger device 6* are extremely higher compared to the consumption of the comprised electrical devices; *and* the [two sets of] rechargeable battery devices 5[a and 5b] are continually charged by this electrical power[; the set device 5a that powers the carbon monoxide sensor device 2, the sound alarm device 3, the switching relay device 4 that controls the unlatch device 8; and the set devise 5b that powers the unlatch device 8 and the normally open and normally close relay device 9 that activates the accessible contacts device 10; have a set of built-in reverse diodes devices 20a and 20b comprised in the solar cell device 6a and 6b, to prevent the rechargeable battery devices 5a and 5b from discharging during the night or any lack of light].

This is how this new window works: the [built-in] carbon monoxide sensor device 2 comprised in this window, [complying with the latest UL standards.] senses the level of carbon monoxide 24 hours a day; and when a dangerous level of carbon monoxide is sensed, it will trigger the sound alarm device 3*; the alarm relay device 9; the interconnections contacts device 22* and [will power] the [normally open] switching relay device 4; therefore, powering the [electric] unlatch device 8 to unlatch the latch/handle device 13 and releasing the universal jamb device 14 with its attached glass pane device 19 or any of the variety of pre-assembled windows device 21; popping open, swinging on the [pivoted] hinges *or swing* device 15 [mounted on the bottom of the primary jam device 12;] pushed open by the [set of built-in] springs *or pressing* device 16 and hold open by the *optional* holding brackets device 17; allowing a flow of outside air to enter the contaminated room and ventilate the carbon monoxide concentration; to save or prevent poisoning or death of humans and animals; at the same time, the [normally open and normally close] *alarm switching* relay device 9 [will be powered by the normally open switching relay device 4; that] will activate the [accessible] *alarm* contacts device 10; and if these [accessible] *alarm* contacts device 10 are connected to a private central alarm station company; will trigger the alert to the Fire & Police Departments to provide immediate assistance.

If this windows [that I claim] are interconnected in the [same floor of the dwelling or in the all] house, by the interconnections contacts device 22; when any of the [windows] interconnected windows senses a dangerous level of carbon monoxide all the inter-connected windows will pop open to ventilate [the] all the rooms/locations where the windows are located, to allow a flow of outside air to enter the rooms and mix new oxygen in the other possible contaminated rooms and/or create a cross ventilation.

Through the above described, [I claim that my] *this* present invention can make a difference in preserving the lives of many people; and the use of this invention can change future EPA reports of the humans that die poisoned by carbon monoxide and the ones that after being poisoned by carbon monoxide survive; but remain with permanent brain damage for life.

2. Description of Related Art

The existing carbon monoxide detectors that comply with UL standard 2034 (1998 revision) and the IAS 6-96 new standard, are doing a great job protecting and preventing the loss of life, but there are some issues that need to be addressed to be more effective in saving human lives; these issues are: the dependency in domestic electrical supply and/or replaceable short term life [alkaline] batteries and the inconsistency of humans in replacing dead batteries; and of more direct consequence and main issue is that the current carbon monoxide detectors do not take any action to resolve the problem when an emergency takes place; they only give a warning sound alert.

Currently used carbon monoxide detectors only protect the occupants with a sound alert, which alerts the occupants that the levels of carbon monoxide have reached a dangerous level of carbon monoxide; this protection is not efficient enough, especially when the majority of the carbon monoxide detectors are located only in the hallways of every level of residential homes [(as per national building codes)]; making this factor an issue in how well the persons can hear the sound alarm from the bedrooms; and even if carbon monoxide detectors are located in the bedrooms, we have to have the following in consideration:

Most elderly people normally have a percentage of hearing loss as well as a very slow reaction to emergencies and confusion due to the age.

This also applies for young children—even if they can hear the alarm, they don't know what it is for or what to do; these two age categories are the most sensitive and most likely to be affected and poisoned by carbon monoxide in a short amount of time even with lower PPS[(Particles Per Second)]—*Particle Per Second*—of carbon monoxide.

All other age groups can also have problems hearing the warning alarm of the present day carbon monoxide detectors if they are sleeping, overtired, stressed from daily activities or under the influence of medications or alcohol; or for people that go to sleep listening to loud music, using earphones, iPods or watching television.

And the last to consider is that in this "time of electronics", it is very common hear all kind of beeping alarms such as cell phones, oven timers, microwave timers, dishwasher timers, wake-up alarms, washer machine timers, dryer machine timers, reminder alarms, smoke detector alarms, home security alarms, cordless phones, answering machines, and watches, to name few; which can be similar to the alarm of the current carbon monoxide detectors; and the getting used to these beeping would result in desensitized ears which may mislead people; not distinguishing if the alarm they hear is a threat to their life and the family or simply another daily reminder or a not dangerous alarm.

Present day line voltage carbon monoxide detectors and alarms can lose their warning capabilities and become an ineffective protection as a result of faults in the electrical power supply, which is especially vulnerable in windy, and rainy days as well in snowstorms; during the winter months, heating furnaces may stop working as a result of electrical power outages; and some people commit the life-threatening mistake of heating up the premises with the gas cooking burners; gas wall ovens; kerosene heaters; propane gas heaters; propane BBQ grills, anything that produces heat without the need of electricity; they do so without realizing that they are producing carbon monoxide in an enclosed area, while the line voltage carbon monoxide detectors are not working due to the failure of the electrical power supply; or if the carbon monoxide detector comprise a backup battery and stat beeping; many people assume that the beeping is related to the power failure.

The other current carbon monoxide detectors, powered by batteries, are also affected and can lose their warning capabilities due to the inconsistency of the occupants [(human error) in] *and the human error of not* replacing old/dead batteries, rendering the system ineffective.

Other present carbon monoxide protection for human beings as: U.S. Pat. No. 7,183,933 "Garage carbon monoxide detector with automatic garage door opening command", protects human beings and animals only when the source of the carbon monoxide comes from the internal combustion of automobiles running inside the garage.

The above invention will not protect human beings and animals when the source of the carbon monoxide come from other sources as gas backup from clogged chimney, defective furnaces, kerosene heaters, propane heaters, or domestic gas cooking burners and ovens, used as a emergency source of heat when power failures shut down the heating furnace; furthermore, this described garage door will not function and will not protect human beings and animals when an electrical power failure occurs.

The difference in this new "Window that senses carbon monoxide and opens by itself powered by light" [that I claim], is that will protect the human beings and animals disregarding the source of the carbon monoxide, and any electrical power failures.

Other present carbon monoxide protection for human beings as: "Window convenience and security system", United States patent Application 20070210737, also will not function and will not protect human beings and animals when a electrical power failure occurs.

This "window convenience and security system", depends on the electrical power supply to activate all the sensors, wireless devices, main control panels, motor drives, microchips, etc.

[The] *This new* window [that I claim] does not need any electrical power supply; furthermore, other advantages of this new window are that: it is a self contained, pre-assembled, and self powered window that can be installed the same way as a regular window or a replacement window by a regular carpenter mechanic, without the need of any other trade mechanics, and does not need any electrical or mechanical assembly in its installation.

Another advantage of this new window is that the universal window sash device 14 of claim 1, allow to install and use any brand name windows of your choice and style available on the market, such as Hopper, Casement, Owing, Double Hang, or Gliding windows, including fixed windows [(not operable)]—*not operable—;* and custom made Elliptical, Circle top, Oval, Arch, Transoms and Triangular windows, operable or not; including its attached sashes, standard hardware, screens, grills and built-in shades or picture windows.

Another existing related carbon monoxide protection as: "Method and devices for improving indoor air quality using window" United States patent [(]Application 0060002836[)], relates to a system that monitors the indoor air quality and, when detecting abnormal air conditions (as accumulation of carbon monoxide), *and* solves the problem "forcibly exhausting the contaminated indoor air by an electric exhaust fan through an exhaust path installed in the window frame".

This described invention will not protect human beings and animals, because the exhaust fan powered by an electric motor will be inoperable in the presence of a electrical power failure.

This new "Window that senses carbon monoxide and opens by itself powered by light" [that I claim], does not depend on any electrical power supply; only *on* the natural, available, free and environmentally friendly light power, and will protect human beings and animals via my innovated method of operation and without the need of any human help.

While this invention has been described in conjunction with the specific embodiments of a hoper window with a universal window jamb device 14, described above in claim 1, it is evident that many alternatives, combinations, modifications and variations are apparent to those skilled in the art; accordingly, the preferred embodiments of this invention as set forth above are intended to be illustrative only, and can be used in different models and styles of windows, including replacement windows, and not in a limited sense, various changes can be made without departing from the spirit and scope of this invention.

BRIEF DESCRIPTION OF THE DRAWINGS

The related features of this invention will become more apparent and the invention itself will be better understood by referencing the following description of the invention in conjunction with the accompanying drawings, wherein:

FIG. 1 Illustrative Diagram of the Electrical Devices. (Drawing, p. 1 of 6)

FIG. 2 Interior Front View of the Window. (Drawing, p. 2 of 6)

FIG. 3 Side View of the Window. (Drawing, p. 3 of 6)

FIG. 4 Exterior Front View of the Window. (Drawing, p. 4 of 6)

FIG. 5 Side & Exterior Front View of Primary Jamb & Universal Window Sash with a Double Hang Window Attached. (Drawing, p. 5 of 6)

FIG. 6 Exterior Front View of Primary Jamb & Universal Sash
and an optional Dummy Jamb and an Attached Universal Jamb. (Drawing, p. 6 of 6)

DETAILED DESCRIPTION OF THE DRAWINGS

Referring to the drawing in FIG. 1 it discloses an illustrative diagram of the electrical devices of the Window that Senses Carbon Monoxide Powered by Light.

The [Independent Set of] Solar Cells *Charger* Device 6[a], [comprising a built-in Reverse Diode device 20a]; *is* exposed to the outside environment without interruption, [is independently connected] to charge the [Independent Set of the] Rechargeable Batteries Device 5[a].

[This Independent Set of Rechargeable Batteries Device 5a, power the Carbon Monoxide Sensor Device 2; the built-in Sound Alarm Device 3; and the Normally Open Switching Relay Device 4; only when activated by the Carbon Monoxide Sensor Device 2.]

[The Independent Set of Solar Cells Device 6b, comprising a built-in independent reverse Diode device 20b; and exposed to the outside environment uninterruptedly, is independently connected to charge the Independent Set of the Rechargeable Batteries Device 5b.]

[This Independent Set of Rechargeable Batteries Device 5b, power the Low Voltage Unlatch Device 8; and the Normally Open and Normally Close Relay Device 9; only when activated by the Carbon Monoxide Sensor Device 2 and therefore activating the Normally Open Switching Relay Device 4.]

When the Carbon Monoxide Sensor Device 2 senses a dangerous level of carbon monoxide, it will trigger the Sound Alarm Device 3, [and will power] the [Normally Open] Switching Relay Device 4 *; the Alarm Relay Device 9;* and the Interconnection contacts device 22.

[The Normally Open] *Therefore the* Switching Relay Device 4, will power the [Low Voltage] Unlatch Device 8; [therefore] releasing the Latch/Handle Device 13 [(]not showed in FIG. 1[)];

[When the Normally Open & Normally Close Relay Device 9 is activated by] the [Normally Open] *Alarm* Switching Relay Device 4, [it] will activate the [Accessible] *Optical Alarm* Contacts Device 10; and if the [Accessible] *Optional* Alarm Contacts device 10 are connected to the private central station alarm it will trigger an alert to the Fire & Police Departments.

Referring to the drawing in FIG. 2, it discloses the interior front view of a "Hoper window" with the Universal Window Sash Device 14, comprising a glass pane device 19; the Primary Jamb Device 12 with space for the [Low Voltage] Unlatch Device 8; the [Accessible] *Optional Alarm* Contacts Device 10; the Universal Window Sash device 14 with a glass pane device 19; the Latch/Handle Device 13 to manually open and close the window; the *Optional* Removable *inside* Cover Device 11 [with perforations to expose] *exposing* the [built-in] Carbon Monoxide Sensor Device 2, to the inside environment, and [display the Green & Read Lights and the Test/Reset Button of the Carbon Monoxide Sensor Device 2; and] to service all the [electrical] devices, [including the replacement of the Carbon Monoxide Sensor Device 2 every five or seven years depending in the type of carbon monoxide sensor device used]; and the Space in [the bottom inside part of] the Primary Jamb device 12 to enclose the [Carbon Monoxide Sensor Device 2; the Sound Alarm Device 3; the Normally Open Switching Relay Device 4; the Normally Open and Normally Close Relay Device 9; the Two Independent Sets of Rechargeable Batteries Device 5a, and Device 5b; Two Independent Solar Cells Devices 6a, and 6b; comprising two Independent built-in Reverse Diode Devices 20a and 20b] *other devices*.

The drawing of FIG. 3 discloses the side view of the window and the location of devices of claim 1, wherein it shows the [Low Voltage] Unlatch Device 8; the window Primary Jamb Device 12; the space for the [built-in] Carbon Monoxide Sensor Device 2; the Sound Alarm Device 3; the [Normally Open] Switching Relay Device 4; the [Normally Open and Normally Close] *Alarm Switching* Relay Device 9; [two Independent sets of] Rechargeable Batteries Devices 5[a and 5b and two independent] *the:* Solar Cells *Charger* Devices 6[a and 6b comprising two Independent built-in Reverse Diodes Devices 20a and 20b].

The [Pivoted] Hinges *or swing* Device 15 holds the Universal Window Sash Device 14, comprising a Glass Pane Device 19, [attached to the bottom of the Primary Jamb Device 12] to swing open, pushed by the [set of] Springs *or Press* Device 16 [only when the Low Voltage Unlatch Device 8 is activated and releases the Latch/Handle Device 13], and the [set of] *Optional* Holding Brackets Device 17 will hold in the open position the Universal Window Sash Device 14.

For illustration purposes only, the Universal Window Sash Device 14 is shown only as half way open; consequently, the [set of] *Optional* Holding Brackets Device 17 are not fully extended.

The drawing in FIG. 4 discloses the exterior front view of the window, wherein it shows the Primary Jamb Device 12; the Universal Window Sash Device 14, with a Glass Pane Device 19; the location of the [Independent set of] Solar Cells *Charger* Device 6[b comprising a built-in Reverse Diode Device 20b] and the [Independent set of] Solar Cells *Charger*

Device 6[a comprising a built-in Reverse Diode Device 20a]; enclosed in the [inside space of the] Primary Jamb Device 12 [on the exterior side of the window of the Primary Jamb Device 12]; and the *Optional* Transparent [Color White] Water-Resistant Cover Device 7, to enclose and expose to the exterior light the [two Independent] Solar Cells *Charger* Device 6[b and 6a comprising its independent built-in Reverse Diodes Devices 20b and 20a, while protecting the other devices from the exterior environment.]

The drawing in FIG. 5 discloses the Side & Exterior Front View of Primary Jamb & Universal Window Sash with a Double Hang Window Attached, wherein the [(]left side[)] discloses the side view of the Primary Jamb Device 12 and the Universal Window Sash Device 14; showing a Double Hang Window one of the full variety of designs and types of pre-assembled windows device 21, installed in the Universal Window Sash Device 14; which is attached to the Primary Jamb Device 12, by [a] the [set of Pivoted] Hinges *or Swing* Device 15; the [set of] Springs *or Press* Device 16; the *Optional* Holding Bracket *Device* 17; the Unlatch Device 8; the Latch/Handle Device 13; the space for the Unlatch Device 8 [on the top of the Primary Jamb Device 12] and the Solar Cells *Charger* Devices 6[a and 6b].

The drawing in FIG. 5 (right side) shows the exterior front view of the Primary Jamb Device 12 and the Universal Window Sash Device 14; showing a Double Hang Window one of the full variety of designs and types of pre-assembled windows device 21, installed in the Universal Window Sash Device 14; which is attached to the Primary Jamb Device 12, by [a] the [set of Pivoted] Hinges *or Swing* Device 15; including the Space for: the Carbon Monoxide Sensor Device 2; the Sound Alarm Device 3; the [Normally Open] Switching relay Device 4; the [Normally Open & Normally Close] *Alarm Switching* Relay Device 9; the [two Independent sets of] Rechargeable Batteries Devices 5[a and 5b, and two Independent]*; the* Solar Cells *Charger* Devices 6[a and 6b; comprising independent built-in reverse diodes Devices 20a and 20b]; and the *Optional* Transparent [Color White] Water-Resistant Cover Device 7.

The drawing in FIG. 6 discloses the Exterior Front View of Primary Jamb & Universal Sash and an optional Dummy Jamb with an attached Universal Jamb; wherein the [(]left side[)] discloses the exterior front view of the Primary Jamb Device 12 & the Universal Sash device 14; comprising the electrical and mechanicals devices of claim 1; (not showed in the drawing), wherein, the Primary Jamb Device 12; the Universal Window Sash Device 14; the [Set of Pivoted] Hinges *or Swing* Device 15; the space for the Unlatch Device 8 [and] the space [for the Carbon Monoxide Sensor Device 2; the Sound Alarm Device 3; the Normally Open Switching Relay Device 4; the Normally Open & Normally Close Relay Device 9; the two Independent Sets of Rechargeable Batteries, Devices 5a and 5b, and the two Independent Solar Cells Devices 6a and 6b comprising independent built-in Reverse Diodes Devices 20a and 20b.] *to comprise the other devices;* and the place were to install any window of a *Full* variety of designs and types of pre-assembled windows Device 21.

The purpose of this Universal Jamb Device 14 attached to the Primary Jamb Device 12 and its attached devices of claim 1; is to have the ability to use the Glass Pane Device 19; or any of the full variety of designs and types of pre-assembled windows device 21 of your choice with the safety fixtures of the "Window with built-in devices that senses carbon monoxide and opens by itself powered by light".

The drawing in FIG. 6 [(]Right Side[)] discloses the exterior front view of the optional "Dummy" Jamb, not comprising any electrical or mechanical devices; and permanently attached to the Universal window sash device 14 of claim 1; the function of this "optional dummy primary jamb", and the permanently attached Universal window sash device 14 of claim 1 is that can be attached to any regular window, to have the same interior & exterior appearance and consistency in the same room, house or building where the "window that senses carbon monoxide and opens by itself powered by light" is installed; this "optional dummy primary jamb device" of is only for architectural design purposes; and has no function; what so ever; with the "window that senses carbon monoxide and opens by itself powered by light" other than architectural design purposes and can be used with any windows; only for design consistency.

This "optional Dummy Jamb Device & the Universal Jamb"; attached to any "other" window will not sense any carbon monoxide and will not open by itself.

The above detailed description of the drawings of the optional Dummy window Jamb was described for design purposes only.

The described functions of this new invention as set forth above are intended to be illustrative only; as described, this new "Window that senses carbon monoxide and opens by itself powered by light" can be manufactured in deferent jambs designs and it is able to accommodate the self-contained and preassembled devices of claim 1 to accommodate different sashes and to be used in different windows other than a Hopper window; as a Casement window, Owing window, Double Hang window, Gliding window, as well custom made elliptical, circle top, oval, arch, transoms and triangular windows.

While one embodiment has been described in a Hopper Window; in the Primary Jamb of the Hoper Window and a Double Hang window installed in the Universal Jamb; and a optional Dummy window Jamb, numerous variations and modifications will occur to those skilled in the art, the invention is not limited to the embodiment disclosed and its scope is defined by the way of the filed claims.

I claim:

1. A window with built-in devices powered by light that senses carbon monoxide and opens by itself to release dangerous levels of concentrated carbon monoxide from an enclosed area, comprising: a primary jamb device 12 suitable to be installed in any home/building walls; an universal window sash device 14 that comprises a glass pane device 19 or a full variety of designs and types of pre-assembled windows device 21; a [built-in] latch/handle device 13 to lock close the universal window sash device 14 to the primary jamb device 12; [a set of pivoted] hinges *or swing* device 15 to swing open the universal window sash device 14 attached to the [bottom of the] primary jamb device 12; [a set of built-in] springs device 16 to push and pop open the universal window sash device 14 [when the latch/handle device 13 gets disengaged/unlatched]; [a set of] *an optional* holding brackets device 17 to hold in an open position the universal window sash device 14 [after was pop open]; a [built-in] carbon monoxide sensor device 2 to sense carbon monoxide [comprising built-in lights: a green light for indicating that the sensor is in operable condition and a red light for indicating when a dangerous level of carbon monoxide is present; a test/reset button for testing or resetting the carbon monoxide sensor device 2]; a [built-in] sound alarm device 3 to sound a warning alarm when dangerous levels of carbon monoxide are sensed; [a built-in low voltage] *an:* unlatch device 8 to unlatch the latch/handle device 13; a [built-in normally open] switching relay device 4 to switch-on the [low voltage] unlatch device 8 [only when the sound alarm device 3 sounds, triggered by the carbon monoxide sensor device 2 after sensing a dangerous level of carbon monoxide]; an [accessible] alarm contacts device 10 to [optionally] be connected to a central alarm station; [a built-in normally open & normally close] *an alarm switching* relay device 9 to trigger the [accessible] alarm contacts device 10, [only when the built-in low voltage unlatch device 8 is activated]; a [built-in independent set of] rechargeable batteries device 5[a] to power the [carbon monoxide sensor device 2, the sound alarm device 3 and the normally open switching relay device 4; a built-in independent set of rechargeable batteries device 5b to power the low voltage unlatch device 8 and the normally open & normally close relay device 9] *electrical devices*; a [built-in independent set of] solar cells *charger* device 6[a] to charge the [independent set of] rechargeable batteries device 5[a; and a built-in independent set of solar cells device 6b to charge the independent set of rechargeable batteries device 5b; two independent reverse diodes devices 20a and 20b to avoid discharging the rechargeable batteries devices 5a and 5b when light is not present]; interconnections contacts device 22 to [be able to] inter-connect additional windows, to pop open [all] the inter-connected windows when any of the windows senses a dangerous level of carbon monoxide; [a] *an optional* transparent [color white] water-resistant cover device 7 to protect the [built-in electrical] devices from the outside environment and to expose the solar cells *charger* device 6[a and device 6b] to the exterior light; [a] *an optional* removable inside cover device 11 [accessible from the interior side of the window] to access and service the [built-in electrical] devices [and replace the carbon monoxide sensor device 2 every five or seven years, depending in the type of carbon monoxide sensor device used]; wherein when a dangerous level of carbon monoxide is sensed by the [built-in] carbon monoxide sensor device 2, *the carbon monoxide sensor device 2 will trigger* the [built-in] sound alarm device 3 [will sound a warning alarm, and] the [built-in normally open] switching relay device 4 [will be powered, both activated by the carbon monoxide device 2] *the interconnections contacts device 22; and the alarm switching relay device 9;* therefore the [built-in normally open] switching relay device 4 will switch-on the [built-in low voltage] unlatch device 8 [mounted on the top of the primary jamb device 12] and [it] will unlatch the latch/handle device 13 [attached on the top of the universal window sash device 14;] therefore the universal window sash device 14 comprising the glass pane devise 19 or any of the variety of pre-assembled windows device 21, will pop open, pressed/pushed by the [set of built-in] springs device 16 [mounted between the universal window sash device 14 and the primary jamb device 12, located on the upper sides of the devices 14 and 12]; swinging open [on a set of pivoted] *by* hinges *or swing* device 15, [attached to the bottom of the primary jamb device 12]; and hold open by [a set of holding] *the optional* brackets device 17 [attached on both sides between the primary jamb device 12 and the universal window sash device 14]; *the inter-connected windows will pop open; and* the [normally open & normally close] *alarm switching* relay device 9, [connected in parallel with the built-in low voltage unlatch device 8] will trigger the [accessible] alarm contacts device 10; [that optionally may be connected to a private central station alarm company], to alert the Fire & Police Department of a dangerous carbon monoxide emergency and to provide immediate assistance to the endangered humans & animals and protect the opened residence; if someone intents to close the universal window sash device 14 while a dangerous level of carbon monoxide remain in the enclosed environment, the universal window sash device 14 with its attached devices 19 or 21, will, not close/lock, until the sensed level of carbon monoxide becomes no longer dangerous to accomplish the purpose of this invention: the release of the accumulated carbon monoxide of the enclosed room/area; and prevent or minimize poisoning and death of humans & animals, without depending on any human physical action; any external power supply, or replaceable [alkaline] batteries; *and* the window can be manually open and closed for regular use in normal conditions, without activating the [accessible] alarm contacts device 10 or triggering the alarm alert.

* * * * *